US009852487B1

(12) United States Patent
Farnsworth et al.

(10) Patent No.: US 9,852,487 B1
(45) Date of Patent: Dec. 26, 2017

(54) METHOD AND SYSTEM FOR INTERACTIVE REMOTE INSPECTION SERVICES

(71) Applicant: United Services Automobile Association (USAA), San Antonio, TX (US)

(72) Inventors: Anthony Farnsworth, San Antonio, TX (US); Wayne Hartman, San Antonio, TX (US); Jonathan Neuse, San Antonio, TX (US); Andrew Higgins, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 444 days.

(21) Appl. No.: 14/134,814

(22) Filed: Dec. 19, 2013

Related U.S. Application Data

(60) Provisional application No. 61/879,465, filed on Sep. 18, 2013.

(51) Int. Cl.
*G06Q 30/06* (2012.01)
*G06Q 50/16* (2012.01)

(52) U.S. Cl.
CPC ........ *G06Q 50/16* (2013.01); *G06Q 30/0617* (2013.01); *G06Q 30/0641* (2013.01); *G06Q 30/0613* (2013.01)

(58) Field of Classification Search
CPC .............................. G06Q 30/06; G06Q 30/08
USPC .................................... 705/26.1–27.2
See application file for complete search history.

(56) References Cited

U.S. PATENT DOCUMENTS

| | | | |
|---|---|---|---|
| 2005/0086158 A1* | 4/2005 | Clare | 705/38 |
| 2005/0125677 A1* | 6/2005 | Michaelides | 713/185 |
| 2006/0112400 A1* | 5/2006 | Zhang | G06Q 50/188 719/328 |
| 2006/0146124 A1* | 7/2006 | Pepperell | H04N 7/15 348/14.08 |
| 2009/0031246 A1* | 1/2009 | Cowtan et al. | 715/786 |
| 2013/0306689 A1* | 11/2013 | Johnson | 224/181 |
| 2014/0012720 A1* | 1/2014 | O'Kane | 705/35 |

* cited by examiner

*Primary Examiner* — Ethan D Civan
*Assistant Examiner* — Ming Shui
(74) *Attorney, Agent, or Firm* — Baker Hostetler LLP

(57) ABSTRACT

A method includes providing a processor and receiving a request to inspect property for sale. The method also includes establishing an audio-visual remote presence connection between at least one buyer and at least one agent, transmitting a plurality of purchase information to at least the buyer, and receiving a plurality of buyer requests for additional information. The method further includes generating, using the processor, a response to at least one of the plurality of buyer requests for additional information and delivering the response to the buyer.

20 Claims, 7 Drawing Sheets

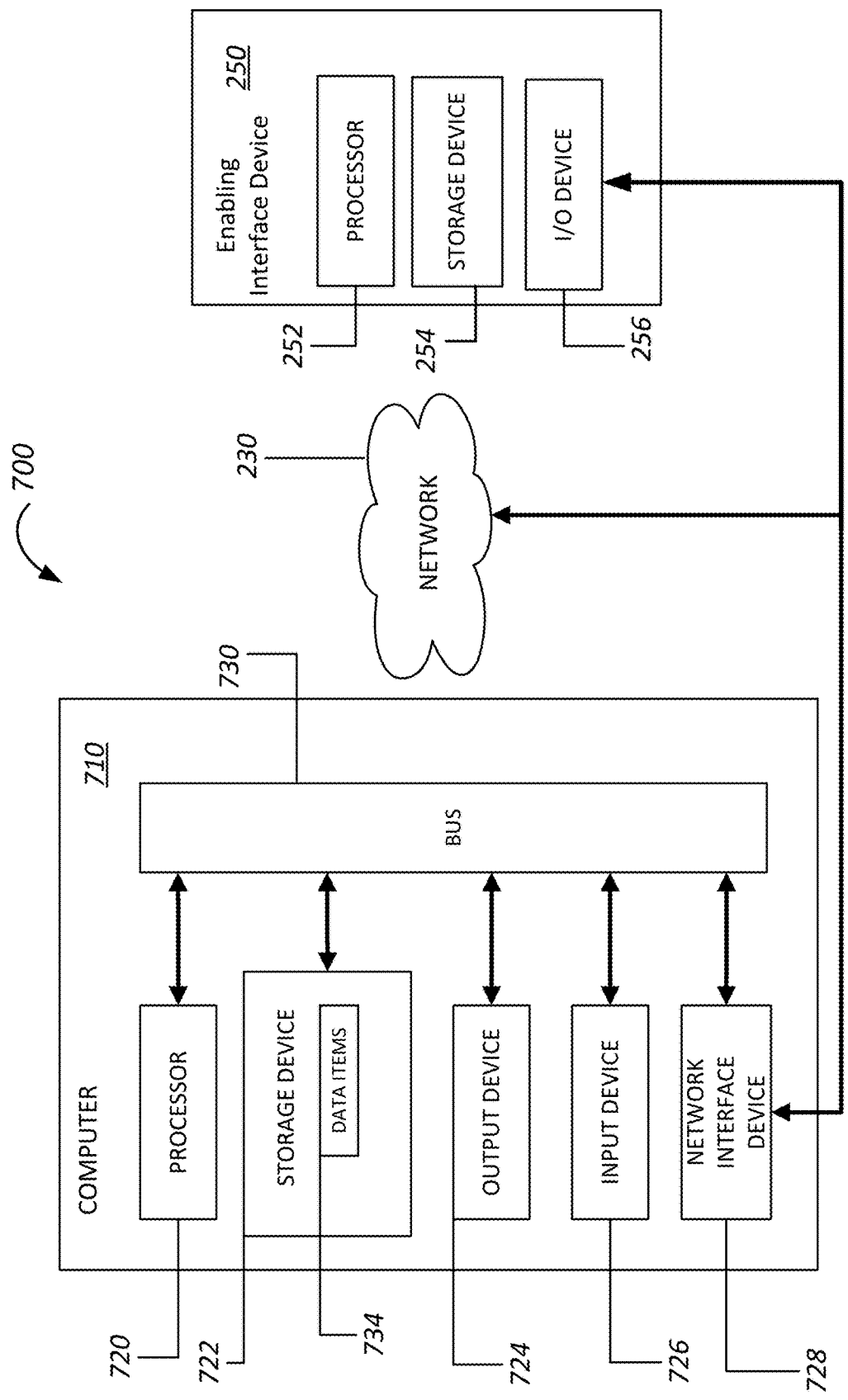

METHOD AND SYSTEM FOR INTERACTIVE REMOTE INSPECTION SERVICES

CROSS-REFERENCES TO RELATED APPLICATIONS

This application claims priority to U.S. Provisional Patent Application No. 61/879,465, filed on Sep. 18, 2013, entitled "Method and System for Interactive Remote Inspection Services," the disclosure of which is hereby incorporated by reference in its entirety for all purposes.

BACKGROUND OF THE INVENTION

Customers demand more of the products and services they use than ever before. They insist that the companies they deal with on a regular basis provide them greater and greater levels of accuracy and more tailored service offerings. Companies configure and operate ever increasing numbers of computer systems to achieve this. Using sources of information that have traditionally been unavailable when servicing these customers is now expected.

SUMMARY OF THE INVENTION

The present invention relates generally to methods and systems in supervised inspections for financial transactions. More specifically, the present invention relates to methods and systems for exchanging relevant transaction information via remote communication between the transaction parties. Merely by way of example, the invention is applied to a method of performing a home walkthrough for a prospective buyer with a realtor interacting with the prospective buyer from a remote location in real time and accessing information sought out by the prospective buyer in real time.

According to an embodiment of the present invention, a method of performing a remotely supervised inspection of property for purchase connects a plurality of parties incident to the transaction that are not co-located. The method receives a request to inspect a property and establishes an audio-visual remote presence connection between the relevant parties. Information regarding the property is exchanged over the remote presence connection, permitting an interactive inspection of property without the physical presence of all the parties at the property location. In one embodiment, a seller or an agent for the seller is co-located with the property while a buyer, or alternatively an agent for the buyer, interfaces with the seller or seller's agent via an audio-visual remote presence connection. In alternative embodiments, a buyer or an agent for the buyer agent is co-located with the property and a seller or an agent for the seller interfaces with the buyer or buyer's agent via an audio-visual remote presence connection.

In one exemplary embodiment, the real time interaction is achieved through a visual relay provided by an enabling interface device, for example Google Glass®. Relevant transaction information may cover three categories: purely objective, slight subjective, and purely subjective. In an example of purely objective information, the real estate agent may provide information such as selling price and property taxes, square footage, and age of the inspected property. In an example of slightly subjective information, an embodiment of the present invention may provide real time insurance quotes for the property that a particular customer would be subjected to. In an example of purely subjective information, an embodiment of the present invention may provide information that conforms to the buyer's unique requests; such unique requests in the real estate context, for illustrative purposes, may comprise commute times to work, quality of local schools, and cost of childcare facilities. Embodiments of the present invention provide these types of information through several means. In one embodiment, calculators coupled to an enabling interface device provide automated responses to requests for transaction information. For example, a square footage calculator can receive measurements of a room from visual tools of the enabling interface device and provide an automated calculation of the floor plan. Other embodiments may use cumulative square footage calculations and visual cues to generate a digital blueprint for later reference. In another embodiment, decorations or furniture are projected through the enabling interface device such that a user can see what a particular property looks like with additional items. For example, a user can access a major furniture store with a wireless application to its furniture specifications; the enabling interface devices may access the application and project selected items onto the user's view of the property. The methods and techniques can be applied to a variety of supervised financial transactions, with many supporting features and technologies to enhance a property viewing experience.

Supervised inspections in financial transactions typically involve many interactions between a number of parties. In real estate, this may include a buyer, a seller, a real estate agent, and a financial institution. Additional delegates and representatives may be further utilized in some embodiments of the present invention. The buyer may rely on the real estate agent to find a property currently for sale, provide information about the property, and act as an intermediary between the buyer and the seller, for example, to arrange a tour or to negotiate the purchase price. Oftentimes, it is difficult for an agent to be physically present with the prospective buyer during the tour due to conflicting appointments. Coordinating a meeting between the parties at the same time is, therefore, prone to inefficiencies or delays in the home buying process. This problem is encountered in other financial transactions. Private sellers of automobiles may employ an agent to facilitate a transaction, or consignment services may pool a number of items for sale by third parties. Coordinating the availability of diverse schedules of parties in these agent-related transactions can introduce unintended transactions costs or other inefficiencies. Similarly, the failure to provide certain information in a timely fashion can lead to uninformed purchases with unknown costs later, or decisions to forego purchases altogether. Information technology as employed by methods and systems of embodiments of the present invention alleviate these costs and inefficiencies.

Numerous benefits are achieved by way of the present invention over conventional techniques. For example, embodiments of the present invention provide greater integration of a customer's unique financial or logistical concerns with physical realities of the inspected property. In such an embodiment, a decision to purchase or rent property is accelerated by the symmetry of information that the customer is primarily concerned about. Embodiments of the present invention provide a cumulative cost of a purchase, including auxiliary costs such as maintenance and repair or insurance or monthly financing. According to one embodiment of the present invention, a method of authenticating security for remotely supervised inspections is achieved. In such an embodiment, users or other third parties are granted security measures through a designated agent for use under the designated agent's approval. Additionally, embodiments of the present invention reduce transaction costs such as travel between property locations and subsequent visits by providing remote presence and the ability to view a stored copy of an inspection at a later time. These and other embodiments of the invention along with many of its advantages and features are described in more detail in conjunction with the text below and attached figures.

BRIEF DESCRIPTION OF THE DRAWINGS

FIG. 7 illustrates a high level schematic diagram illustrating a computer system including instructions to perform any one or more of the methodologies described herein.

DETAILED DESCRIPTION OF THE INVENTION

Figure 1:
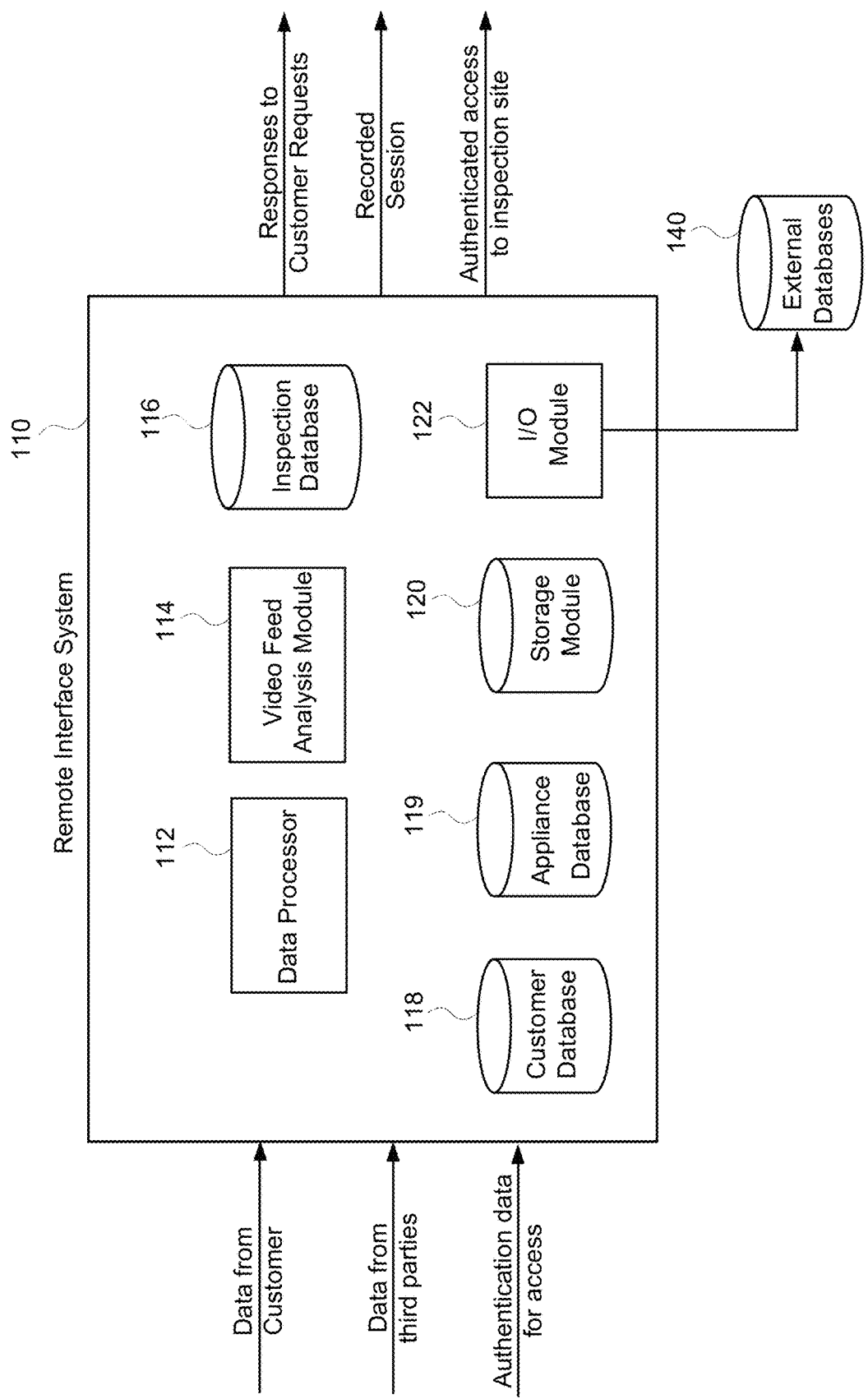
FIG. 1 illustrates a high level block diagram of a remote interface system for receiving input, and processing the input through several databases to generate desired output in accordance with an example embodiment.

Embodiments of the present invention relate to technologies to assist customers find, acquire, insure, or maintain property. Technologies related to embodiments of the present invention support a customer, for example a member of the present assignee, in gathering information and making initial preparations associated with financial transactions incident to physical inspections. Such transactions, merely by way of example, include purchase or rental of a home or apartment. Physical inspections of property, and the information gathering associated in a physical inspection are facilitated by providing remote supervision by agents. In embodiments related to real estate, such agents may comprise realtors. Initial preparation can include advice and counseling related to a customer's ability to afford a particular property (e.g. home or apartment, development of a financial plan to facilitate the acquisition, web-enabled self-service systems (e.g., home purchase calculators) used to determine financial goals and requirements, and/or on-line member communities related to purchase or rental.

After a customer completes initial preparation, technologies related to embodiments of the present invention assist the customer in finding suitable properties through the use of purchase or rental listings including information tailored to the customer's interests and background. For example, pre-approval of the customer for mortgage rates and homeowner's or renter's insurance provides rich information content as part of the search process. Online communities assist customers in finding property that is suitable for the particular customer's interests or income. Additional filters for initial preparation are of course possible. For embodiments in the real estate context, additional filters include information such as commute time to employment location, quality of schools, average home prices in the area, or cost of utilities for the property.

Additionally, technologies related to embodiments of the present invention provide for assistance in the purchase or rental transaction. For example, an embodiment of the invention includes obtaining a mortgage and provision of assistance in negotiating the purchase or lease. Alternative embodiments assist in obtaining an auto loan. Protection of the newly acquired property is also enabled by embodiments of the present invention in one of several forms. In embodiments related to real estate, these protections include but are not limited to homeowner's insurance, mortgage life insurance, renter's insurance, personal property insurance, home security systems, home warranties, and the like. In embodiments related to automobile purchases, auto insurance protection is researched and available policies and corresponding premiums and coverage presented to the customer.

Moreover, technologies related to embodiments of the present invention provide a person with logistical assistance for the newly purchased or rented property. Merely by way of example, embodiments related to real estate may provide information and assistance for moving to, maintaining or renovating, or refinancing the newly purchased or rented property. In another embodiment, a purchase of an automobile may include delivery or shipping the newly purchased automobile to the customer. Thus, embodiments of the present invention relate to technologies that provide a one-stop resource for delivering solutions related to purchasing, selling, renting, or owning property. In particular embodiments, members of a membership organization (e.g., the present assignee) utilize the methods and systems described herein to manage their property interests.

Supervised inspections in financial transactions typically involve many interactions between a number of parties. To illustrate this in the real estate context, the parties include at a minimum a buyer, a seller, a real estate agent, and a financial institution. The buyer may rely on the real estate agent to find a property currently for sale, provide information about the property, and act as an intermediary between the buyer and the seller, for example, to arrange a tour or to negotiate the purchase price. Oftentimes, a realtor may not be able to be physically present with the buyer during the tour due to conflicting appointments. Coordinating a meeting between the parties at the same time is therefore prone to inefficiencies or delays in the home buying process. Coordination of availability of diverse schedules of parties in these agent-related transactions can introduce unintended transactions costs or other inefficiencies.

According to an embodiment of the present invention, a virtual or audio-visual remote presence realtor is provided to allow a customer to tour a home for sale without requiring the physical presence of a real estate agent, seller, or other guide. Similarly, in an alternative embodiment, a real estate agent, seller, or guide is physically at the home while the buyer participates in a virtual or audio-visual remote presence guided tour from a different location. Embodiments of the present invention enable this remote presence interaction through information technology enabling interface devices that establish an audio-visual remote presence connection between the transaction parties. The customer and agent establish this audio-visual remote presence connection over a remote interface system. Examples of enabling interface devices that establish an audio-visual remote presence connection include mobile devices, smartphones or their associated "apps," or various hardware systems. Embodiments of enabling interface devices are preferably hands-free devices and most preferably visual cue hands-free devices such as a Google Glass® or other head mounted display device.

In certain embodiments, communication during this remote interaction can be a visual and/or an audio interaction. In one embodiment, the enabling interface device may include a head mounted display device wherein the wearer's field of view is aligned with a display of information related to the field of view. In an alternative embodiment, additional information not related to the field of view may be displayed on the head mounted display device. In such a head mounted display device, the display is preferably translucent and most preferably transparent to allow interaction with the surrounding environment concurrent with reviewing displayed information.

Although some embodiments are discussed in terms of augmented reality displays in the form of video glasses, transparent lenses, smart phones, and the like, embodiments of the present invention are not limited to these particular examples. Rather, embodiments of the present invention include display technologies that provide augmented reality functionality, for example, contact lenses with included screens, projection of images into the eye, and the like. One of ordinary skill in the art would recognize many variations, modifications, and alternatives.

In an embodiment of the present invention relating to real estate, a customer receives information about property available for sale or rent from a virtual agent. Customers that desire to view the property may be given directions to the property by the enabling interface device. Alternatively, the customer may arrive at the property independently and engage with the virtual agent through the enabling interface means upon arrival. Connection with the virtual agent may be achieved through several means. In one embodiment the connection may be established through member service servers, for example the financial institution the customer is associated with hosts a server to connect the customer and agent and stored exchanged information. In another embodiment, the connection may be established over cellular networks and information may be stored on cloud servers associated with the customer or agent. The virtual agent can begin the information exchange incident to the inspection at any time. For example, while the prospective buyer or renter is en route to the property the virtual agent can review general information about the property with the customer. In an alternative embodiment, the information exchange may begin once the customer is viewing the property.

Concurrent with viewing the property, which may be done by the customer physically at the property or by the customer observing remotely through the enabling interface device, information may be exchanged between the parties. According to an embodiment in the real estate context, the customer may request for additional information and responses for the requested information may be relayed by the virtual agent. Responses may comprise data researched by the agent and then displayed to the customer to address unscripted requests for additional information, and also automated responses. For example, in one embodiment, the customer may request information related to energy efficiency of an inspected real estate property. The agent may research the information through available databases relating to energy efficiency then transmit the response to the customer through the enabling interface device. Available databases may be web resources, technical manuals, or information stored on the agent's own internal databases. In another embodiment, a microphone on the enabling interface device may listen for key words and phrases from the customer and the device may respond independent of agent-directed research. For example, the customer may state, "I like this," and the device may prompt the remote interface system to display a "Favorited!" notification to the customer on the enabling interface device and store the property listing or the video feed of the inspection into a storage means associated with the customer. These exchanges of additional information requested by the customer may be concurrent with the inspection or provision of standard property information. Embodiments of the present invention thus enable highlighting information that is particularly interesting or relevant to a customer. The agent responds to the buyer's questions by pushing additional information subjective to a customer's own concerns to the customer's device, enabling the seamless exchange of information most applicable to the presently transacting parties. Embodiments of the present invention service other transactions as well. As an example, in the auto sales context, a prospective buyer inspecting a vehicle may request the maintenance history and the supervising agent may research the information from a remote location and send the response through an enabling interface device to the customer.

Embodiments of the present invention may reduce inefficiencies relating to inspecting property before purchase. For example, as much as thirty percent of a real estate agent's time may be devoted to travel between properties. Virtual or remote travel to property may reduce this inefficiency, enabling a single agent to service more customers. Similarly, embodiments providing remote travel to a customer may enable the customer to view more properties within a given time period.

According to another embodiment, underwriting for purchasing a property may be conducted in conjunction with the inspection. In one embodiment, having a virtual agent be part of the customer's supporting financial institution may streamline the exchange of information about the customer and enable faster transaction times. For example, in an embodiment, a virtual real estate agent associated with the customer's financial institution can guide a customer through a home concurrent with a mortgage underwriter providing applicable interest rates and lending terms for the particular property inspected. Such an embodiment can provide the monthly mortgage payment from the underwriter and the virtual agent adds in additional relevant costs such as utility costs, homeowner association fees, or property taxes to provide a cumulative cost. Such an embodiment may provide optimal information symmetry in real time regarding the integrated costs of a particular purchase.

In another embodiment, non-financial information may be exchanged. In such an embodiment crime statistics may be requested by the customer and the agent may provide a crime report for the area. In an alternative embodiment, the agent may provide a map of the area on the enabling interface device, with an overlay of reported crimes and their locations. In another embodiment, an overlay of local restaurants may be provided on a map the customer sees on the enabling interface device. Other embodiments of the present invention may display overlays of any available information the customer requests.

In another embodiment, the customer may elect to record the entire inspection, store the inspection in a database, and make associated notes for the recorded tour. These embodiments may utilize a camera capable of recording video or photographs or recording video and photographs simultaneously. In one embodiment, the entire inspection may be recorded enabling a playback that may show the property as well as the visual highlights and visual representations of virtual agents' responses to customer questions. During a recording, a customer may make associated notes for future reference. For example, an associated note may include a command such as "Favorite this" to reference a recorded tour with priority over other stored tours. In another embodiment, the customer may issue a command to share the recorded tour with a third party. In a preferred embodiment, the commands may be voice prompted by the customer, in other embodiments the customer may manually enter the command through the enabling interface device.

Embodiments of the present invention may provide inspection for as many prospective purchases as the customer decides. For example, in one embodiment the customer may conclude one inspection and the virtual agent may provide directions to the next piece of property in the area the customer has indicated they would like to inspect. Other embodiments may direct the customer to other sites the customer indicates they would like to view; other sites, for illustrative purposes, may include local parks or schools or purchase sites for non-real estate property. The virtual agent may remain connected to the customer for these auxiliary inspections. In certain embodiments of the invention, there may be an exchange of virtual agents to provide optimal information exchange on a particular property inspected.

Security for access to property remains a concern in transactions that require an inspection. For example, real estate walkthroughs with a customer typically involve lockboxes of the property's keys so that only the real estate agent has access to the property. Embodiments of the present invention may provide authentication tokens to customers for security access. In one embodiment of the present invention, a security authentication token may be digitally provided. In one example, a remote real estate agent may transmit a digital certificate to a customer through the enabling interface device. The enabling interface device may enable the buyer to access the property by authenticating the digital authentication token via nearfield or other wireless communication. Accordingly, the access may be tied to the customer and in one embodiment for a temporary period such that the access may expire after the inspection and the customer is able to access the property through subsequent authentication. In alternative embodiments, authentication tokens may have a set time limit for access. The virtual agent may be alerted when the time limit is approaching and subsequent authorization is required or when a time limit is violated. Other embodiments of authentication tokens may grant a one-time code to customers wishing to view a property. For example, a lockbox for property keys may be accessed by a customer via text message of the combination for the lockbox, or a customer may respond to a text message integrated with the lock features thereby unlocking the security. In alternative embodiments, access to keys may be provided in a lockbox, and the supervising agent may be alerted if the keys are not returned or if the time limit for access to the keys is exceeded. In yet another embodiment, keys and codes may be removed from the process altogether and the property's security features may unlock concurrent with detecting an authentication token through, for example, Bluetooth or other nearfield communication means from an enabling interface device. It should be appreciated that the authentication tokens described herein is one example of a method for providing secure access to a property and is not limiting on further means and methods for providing security. For example, biometric tools may be utilized to provide secure access, in other embodiments.

In certain embodiments with a recording feature of the tour, the virtual agent may also record and store the inspection. In this embodiment, the security of the property may be validated as the agent can verify the condition of a property during the inspection. In another embodiment, the agent may review the recorded inspection and track customer trends to better learn the customer's preferences.

Embodiments of the present invention may also integrate automated tools. In one embodiment in the real estate context, a calculator for determining dimensions in a room may take cues from visual elements as seen through an enabling interface device. The calculator may then interact with a computer aided design tool to create a three dimensional floor plan. The three dimensional floor plan may be stored for later access. In another embodiment, the customer may provide dimensions of furniture and the calculator may determine whether the furniture will fit in a given room. In one embodiment, the three dimensional floor plan may project the dimensions of the furniture to illustrate what the room may look like with the customer's furniture in the room. In one embodiment, the enabling interface device may project digital images of the customer's furniture onto the field of view display to illustrate what the room may look like with the customer's furniture in the room. In one embodiment, in the context of automobiles, the enabling interface device may determine the dimensions of cargo or trunk space of a vehicle and the customer may confirm whether sports equipment such as a bicycle will fit.

Embodiments of the present invention may also integrate purchasing aids. In one embodiment related to auto sales, a virtual agent can assist a customer in identifying comparable market values for a particular car and model and advise a customer in real time during the negotiation portion of auto-financing with an auto dealer. In an embodiment for real estate purchases, the virtual agent can negotiate closing conditions or price adjustments as a function of the customer's concerns regarding real estate. In an alternative embodiment, an approved appraiser may view the inspection as well, and offer preapproval for a mortgage. In such an embodiment, the approved appraiser may conduct a visual inspection in real time with the customer to verify property conditions incident to appraisal, thereby streamlining the loan process.

In addition to the customer and agent, an embodiment of the present invention may share the inspection with third parties. In such embodiments, the customer may select a list of viewers to watch the inspection in real time. In alternative embodiments, this selected list of viewers may be granted access to a recording of the inspection after the inspection is concluded. In another embodiment, the agent may be physically present at the property location conducting an inspection while the customer or multiple customers remotely view the single feed as provided from the agent's perspective. This embodiment may resemble open house real estate practices. This embodiment may enable a customer-viewer to submit an offer for the home in response to other customer-viewer interest, and other customer-viewers may make other offers permitting a digital live-auction during the inspection. In alternative embodiments, multiple customers can view from a common location, for example in a conference room, or the multiple customers may be at their own dispersed locations.

Drawing various information points, as embodiments of the invention do, creates a clear picture of the actual or cumulative cost of purchasing property. In one embodiment, the customer may inspect appliances and their serial numbers. The virtual agent may then research the service history of that appliance and integrate the service history cost, or cost of replacing a unit nearing the end of its service life, into the cost of purchase. In an alternative embodiment, the enabling interface device may research the appliance information independent of the virtual agent and integrate the result into a cost calculator for the customer.

In another embodiment, the structure of the property itself may be analyzed by the enabling interface device. For example, in one embodiment the enabling interface device may monitor the insulation in the home via infrared sensors. In another embodiment, leaks in the construction that lead to loss of air conditioning or heating systems may be detected by sensors monitoring air flow in the property. It should be appreciated that visual sensors in an enabling interface device are not the only form of analytical sensors employed by embodiments of the present invention. In yet another embodiment, the structural features of a home may be analyzed by radar or ultrasound sensors and associated costs of repair and impact on insurance may be integrated into the cumulative cost of the purchase. In other embodiments, radar and ultrasound sensors measure other subsurface conditions in response to a customer request. Such a request may include termite or mold presence. It should also be appreciated that the sensors may be employed by an enabling interface device that can remove the need for one of the parties to the inspection process. In one such embodiment, the enabling interface device may be a self-contained drone device deployed at the property for sale. The buyer pilots the drone through the property from a remote location, permitting an unsupervised inspection. In one embodiment, the drone may provide its own wireless control network, such as 4G, to enable remote piloting. Software applications in the drone control movement may ensure that no property damage occurs during the unsupervised inspection. Alternative embodiments of a drone may incorporate infrared, radar, or ultrasound sensors in addition to video cameras to gather information for providing automated responses to customer questions about the property. In one embodiment, the drone may be used for quick inspections of properties to assist the buyer in eliminating or identifying properties that need to be inspected in person.

Embodiments of the present invention may also provide relevant feedback to the property sellers. In one embodiment, the inspection may be recorded and stored on a medium accessible by the seller. Alternatively, the seller may also view the inspection in real time with the agent and customer. In other embodiments, a transcript of the inspection may be recorded by, for illustrative purposes, speech to text software. Certain repetitive terms and phrases may be highlighted in the transcript, thereby drawing the seller's attention to any regular questions or concerns that a customer has regarding the property in question. In another embodiment, the visual record may be shared with the seller. in this embodiment the seller may use geo-locating applications to determine which rooms customers spend the most time in. In alternative embodiments, geo-locating applications may be replaced with temperature sensors to detect the presence and duration of customers in particular areas. In alternative embodiments outside the real estate context, the seller can review what features of an automobile are most relevant to purchase (for example, how much time is spent looking at components in the forward engine compartment as compared to interior) or for artwork or similar consignment items which articles are most frequently viewed and for the greatest duration.

Embodiments of the invention employing external sensors as discussed above may further integrate the enabling interface device with ambient controls related to the property for sale. For example, the enabling interface device may record and store ambient temperature during successful sales and then adjust the ambient temperature for the instant property inspected to match that historically successful temperature.

In another embodiment of the invention, related financial aspects may be integrated into the particular property. For example, for consignment items, a new personal property insurance premium may be calculated and presented to the customer. In real estate embodiments, the auto insurance premium as affected by the prevailing rate of the zip code and resultant customer commute may be presented to the customer. In another embodiment, the general cost of living may be calculated into the cost; for example the average price of gasoline and expected gasoline expenditure as calculated by commute distance and groceries in the area may be compared to a real estate property in a different area.

In other embodiments, the aforementioned related aspects to a property purchase are the initial preparation to generate eligible properties for the customer to inspect. For example, a customer may limit eligible properties for inspection to those within a certain distance from a given work location. In another embodiment, the customer may limit eligible property to those that do not exceed a cumulative monthly cost comprising mortgage, all insurance adjustments, and cost of living.

Costs of modification may also be calculated by embodiments of the present invention. In one embodiment, the enabling interface device may detect a wall surface in a real estate property and the customer may elect to analyze the cost of repainting the wall. The enabling interface device may then calculate the surface area of the wall and calculate the amount and cost of paint or the cost of local contractor handyman services to repaint the wall. The device may then present that calculation to the customer as part of the recorded inspection.

FIG. 1 shows a high level block diagram of a remote interface system 110 for collecting data inputs, processing the inputs, supplying optimized outputs in support of a remotely supervised inspection in financial transactions. As illustrated in FIG. 1, data points may be provided by a customer and/or one or more third parties. Data points may also include authentication data for access to property. Customer data points may comprise requests for information as well as a video data feed of the inspected property. Third party data points may comprise input from the agent or other parties related to the transaction (e.g. parties a recorded inspection is shared with) as well as data related to inanimate objects such as appliance models and property dimensions. Authentication data may comprise near field communication, Blue Tooth, and mobile communication services.

Figure 6:
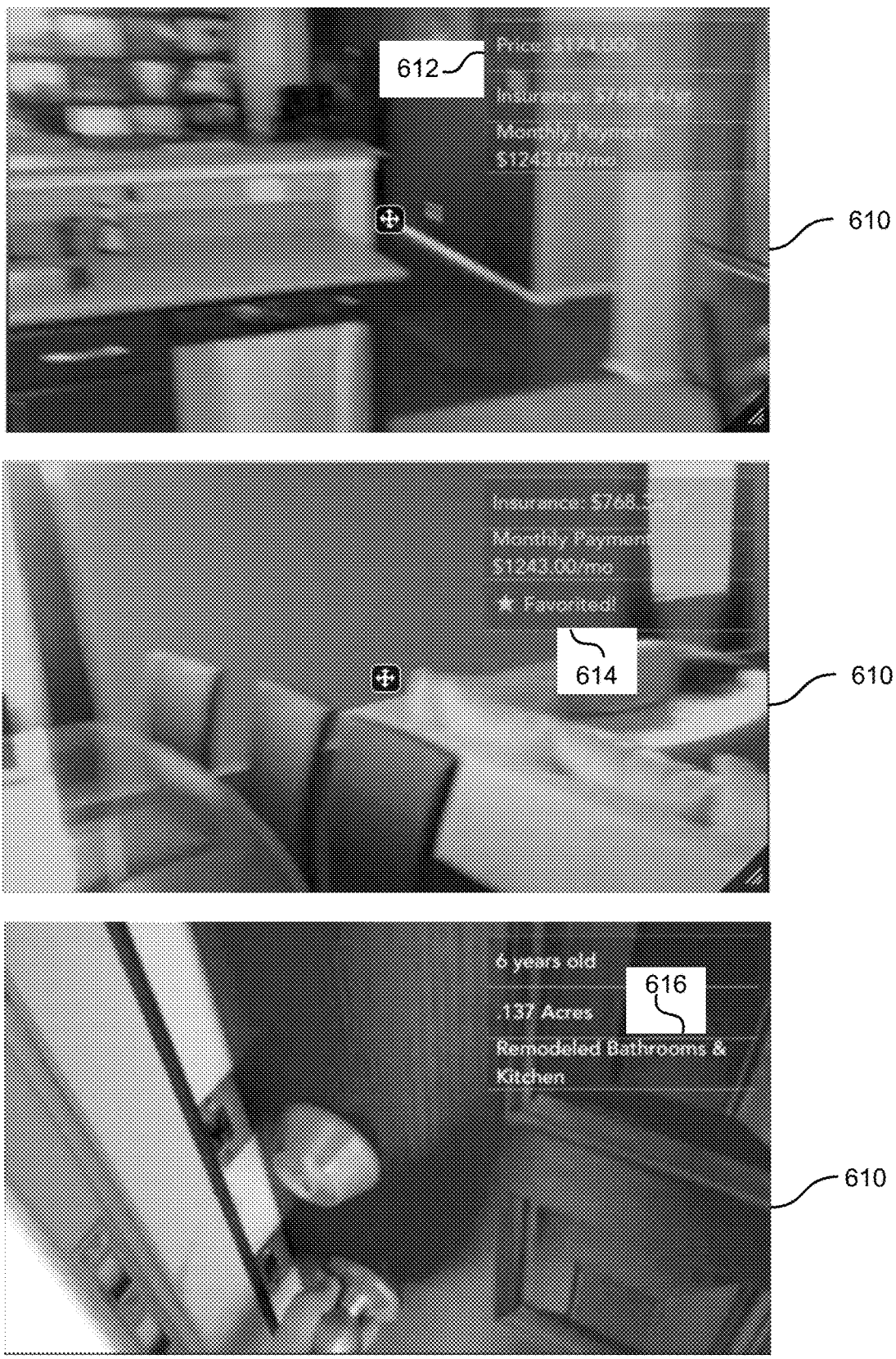
FIG. 6 illustrates enabling interface device visual display templates for displaying various responses to requests for information or standard information for the remote inspection of property according to an embodiment of the present invention.

In some embodiments, the remote interface system 110 may include a data processor 112 (also referred to as a processor), a video feed analysis module 114, a storage module 120 (also referred to as memory), and one or more databases. As illustrated in FIG. 1, the databases may include an inspection database 116, a customer database 118, an appliance database 119, and access to one or more external databases 140. An I/O module 122 may be provided to communicate with external database(s) 140 that may provide information useful to the system. The remote interface system is illustrated and described in more detail in relation to FIG. 2. The description provided in relation to processors and memory in FIG. 6 is also applicable to data processor 112 and storage module 120 shown in FIG. 1. In some embodiments, the video feed analysis module 114 may be configured to generate a video feed of the inspection. These components interact with one another to process the received data point inputs and provide the outputs illustrated in FIG. 1.

Each database stores a variety of information either associated with a customer or associated with the property inspected. Customer database 118, for example, may store information comprising the customer's vehicle identification number to facilitate calculation of auto insurance premiums during property inspection and past recordings of "favorite" customer inspections. Inspection database 116, for example, may store information comprising a list of eligible properties for the customer to inspect as determined by the initial preparations provided by the customer. Appliance database 119, for example, may store information comprising commonly owned appliance technical information to assist analysis of maintenance and service life of a property's component appliances. Storage module 120 may store information comprising common memory access functions and processor instructions. In some embodiments, storage module 120 may store a video feed of the inspection.

Figure 2:
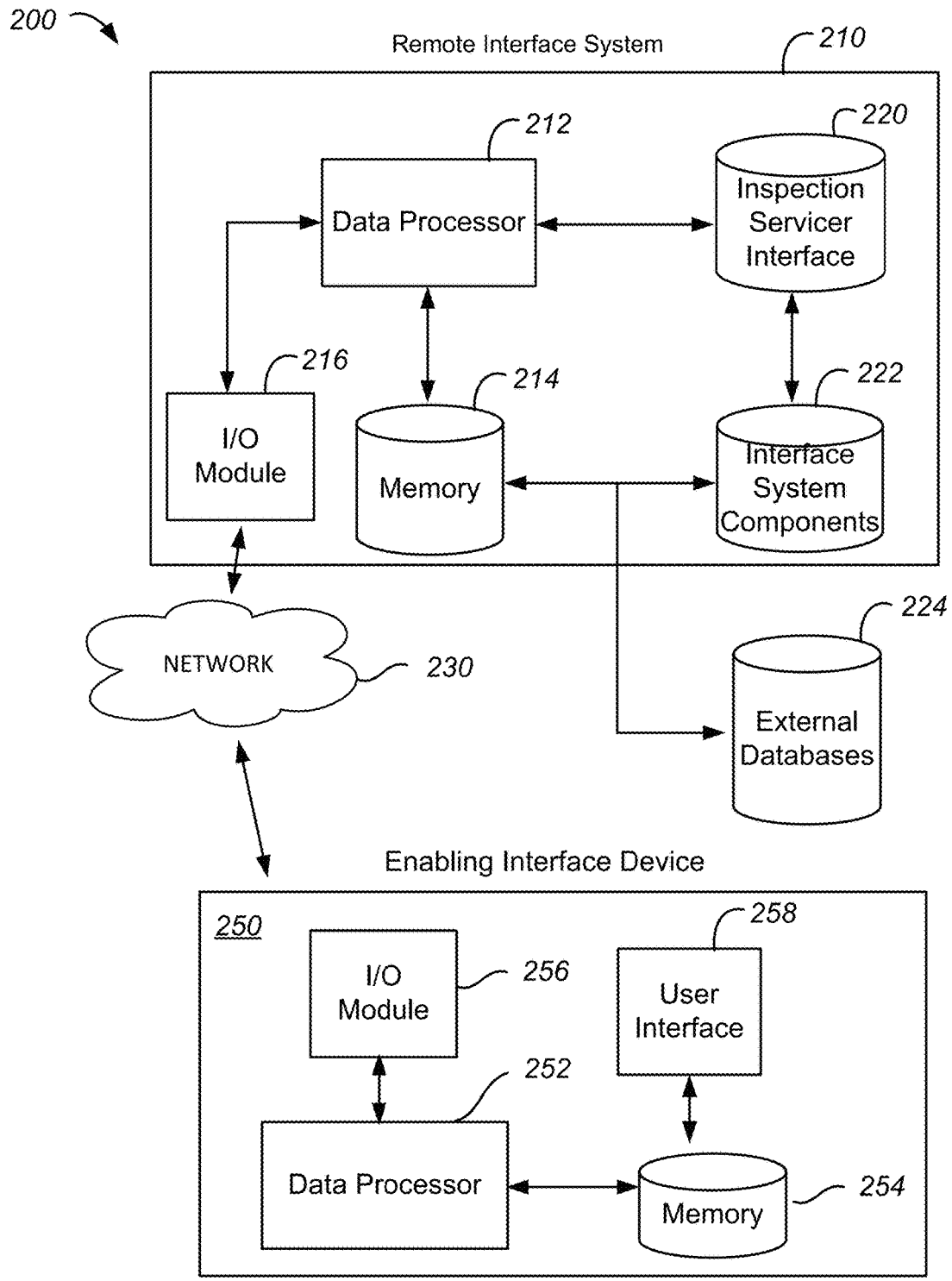
FIG. 2 illustrates a high level schematic diagram illustrating a system employed by a customer to interact with a remote interface system through an enabling interface device according to an embodiment of the present invention.

FIG. 2 is a high level schematic diagram illustrating a remote inspection system 200 according to an embodiment of the present invention. As illustrated in FIG. 2, in one embodiment, the remote interface system 210 may interact with an enabling interface device 250 that a customer may use to send and receive requested information during a supervised inspection incident to a financial transaction. In one embodiment, the remote interface system 210 may include a data processor 212 and a memory 214. The I/O module 216 may provide for communication with the I/O module 256 in the enabling interface device 250 through network 230. The network 230 may be the same as or similar to the network 230 described in relation to FIG. 6. In one embodiment, the remote interface system 210 may also include an inspection servicer interface 220 which permits a supervising agent (e.g., a virtual agent) to interact with the customer (e.g., a buyer) through the remote inspection system 200. The remote interface system 210 may also include interface system components 222 as described more fully in FIG. 1 such as the databases 116, 118, 119, and the video feed analysis module 114. External databases 224 are accessible to the remote interface system to provide information as will be evident to one of skill in the art.

The enabling interface device 250, as described more fully herein, may include a data processor 252 as well as a memory 254. A user interface 258 may be provided that can include input and output functionality including a camera, a speaker, a microphone, a screen to display text, images, video, and the like, a text input function, and the like. As an example, the enabling interface device 250 may be a smart phone. In one embodiment, the enabling interface device 250 may be a head mounted visual display device such as Google Glass®. One of ordinary skill in the art would, however, recognize many variations, modifications, and alternatives.

Figure 3:
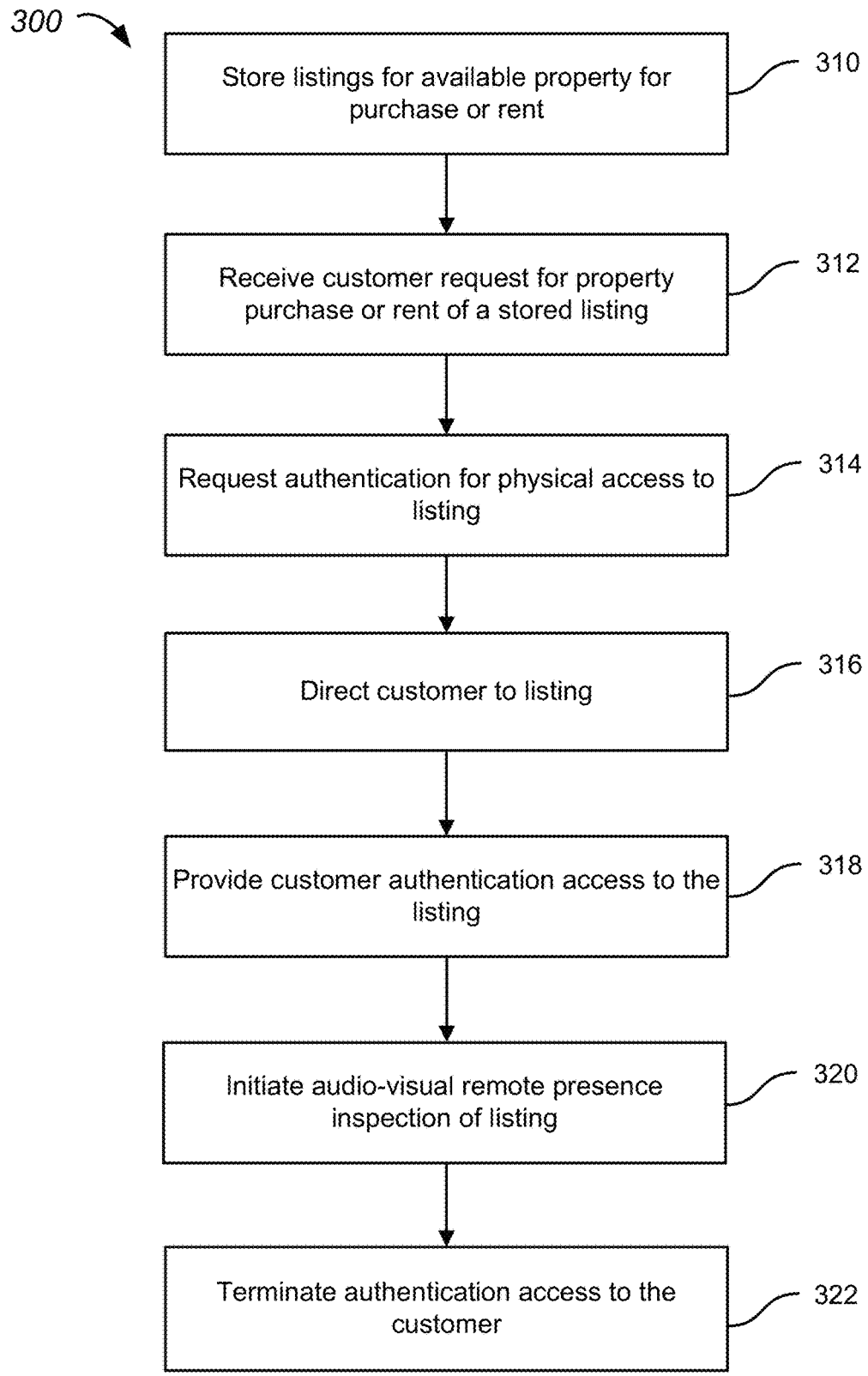
FIG. 3 illustrates a high level flowchart illustrating a method of providing property availability, authenticated access, and remote inspection information during the period of authenticated access according to an embodiment of the present invention.

It should be appreciated that the specific steps illustrated in FIG. 3 provide a particular method of authenticating security access for inspecting property according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 3 illustrates a flowchart of method 300 for granting authenticated security access to customers inspecting a property under remote supervision by an agent. Method 300 is initiated by storing property listings for a customer (e.g., a buyer) to inspect at 310. Determining which listings are stored may comprise responding to information as provided by a customer's initial preparations and determining eligible property as defined by prequalified financing for the customer. At 312 the customer elects a property to view from the stored listings. At 314 the remote interface system (e.g., 210) or the virtual agent responsible for remotely supervising the property inspection requests security authentication for access for the property. The remote interface system or the virtual agent responsible for remotely supervising the inspection directs the customer to the property at 316. This step may comprise several means of directing the customer to the property including providing text message directions or other readable instructions, audio guides, or visual cues that may be displayed from an enabling interface device as described more fully in other parts of this application, or by GPS systems. Upon detecting arrival of the customer at the property, the remote interface system (e.g., 210) or the virtual agent responsible for remotely supervising the inspection may provide the customer at 318 security authentication for access to the listing. In some embodiments, the remote interface system may transmit an authentication token via the network (e.g., 230) to a visual interface device (e.g., the enabling interface device 250) associated with the customer and enable the customer to access the property using the authentication token via the visual interface device. Provision of security authentication for access may be achieved through several possible means. In one embodiment, step 318 may be performed by Blue Tooth access via digital certificate to the property's security features. In an alternative embodiment, step 318 may be performed by forwarding a mobile text message to a lockbox for keys to the property. After access is granted, the remotely supervised inspection of the property ensues at 320. The remote supervision comprises the elements described more fully in other parts of this application that describe the request and provision of information between the customer and agent. Upon conclusion of the remotely supervised inspection, the customer leaves the property and the security authentication for access expires at 322. Security authentication for access expiration at 322 need not occur immediately upon conclusion of the inspection and persons having skill in the art will appreciate the range of possible triggers and durations for access to a customer.

Figure 4:
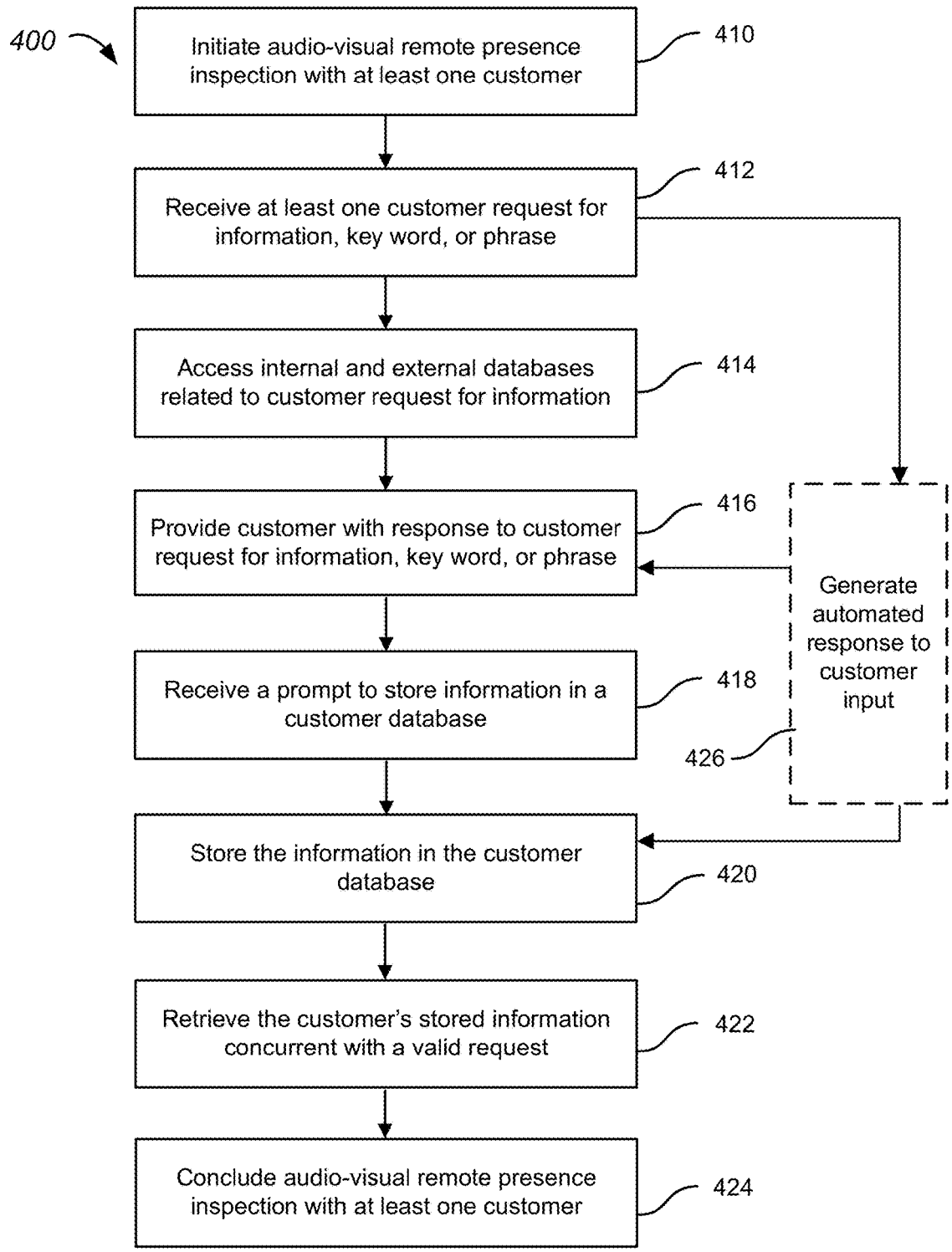
FIG. 4 illustrates a high level flow chart illustrating a method of receiving a customer request for information and responding and storing the information for subsequent retrieval according to an embodiment of the present invention.

It should be appreciated that the specific steps illustrated in FIG. 4 provide a particular method of conducting a remotely supervised property inspection according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 4 illustrates a flowchart of method 400 for conducting a remotely supervised property inspection, in accordance with one embodiment of the invention. Method 400 initiates with step 410, by establishing an audio-visual remote connection (e.g., via network 230) between a customer (e.g., a buyer) and an agent. Step 410 begins at the property location in one embodiment, and during travel to the property in an alternative embodiment. At step 412, the remote interface system or the virtual agent responsible for remotely supervising the inspection receives a customer request for information; the scope of this information may include an objective data point such as the cost of the property or a subjective data point such as adjustment to auto insurance premiums of the customer. The method of receiving a customer request for information is received, in one embodiment, through a microphone on the enabling interface device. In other embodiments, the customer's request for information may be received as a text message from the customer, via the enabling interface device. At 414 the remote interface system or the virtual agent responsible for remotely supervising the inspection accesses information databases to produce a response to the customer request for information. Alternatively, at 426 the remote interface system detects key words or phrases through the microphone and provides automatic responses to the customer at 416. At 416, a response from the database analysis is delivered to the customer. This delivery may be to the enabling interface device as a visual response according to one embodiment of the invention or in an alternative embodiment, may be an audio message. In one embodiment, the customer may decide to store the requested information for future reference and at 418 this command may be received by the remote interface system or the virtual agent responsible for remotely supervising the inspection. Alternatively, embodiments of method 400 may also store automatic responses to key words or phrases from the customer. For example, a customer statement of "I like this" may prompt the remote interface system to store the property in a database associated with the customer at 420. At 420, automated responses or requested information is stored in a customer database, such as customer database 118 as described in FIG. 1. The customer may retrieve this stored information at 422, and in alternative embodiments this is executed between different steps of the method. For example the customer may retrieve the stored information after the conclusion of the inspection. Otherwise, the inspection may conclude at 424 in one embodiment of method 400 after customer retrieval of certain stored information. One having skill in the art will appreciate that any number of customers may concurrently participate in method 400 and step 424 does not conclude the inspection for all customers, rather only those that elect to. In alternative embodiments, step 410 may also initiate visual or audio recording of the inspection. In one embodiment of method 400 both visual and audio recording may be enabled as in user interface 258 of FIG. 2. In a particular embodiment, the visual and audio recording may be enabled with a photograph capability of the enabling interface device via a head mounted visual display device such as Google Glass®.

Figure 5:
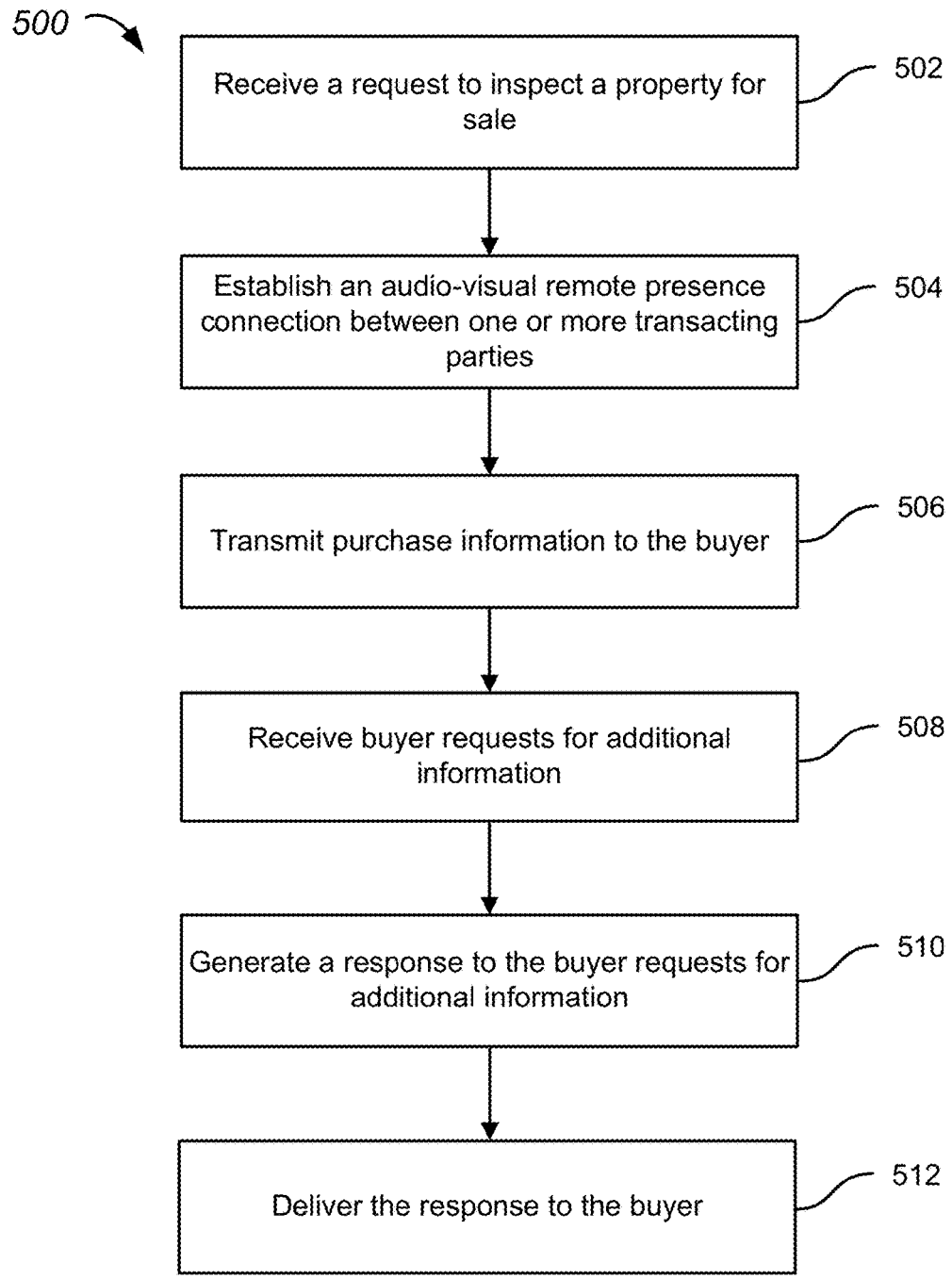
FIG. 5 illustrates a flowchart for performing a remotely supervised inspection of a property for purchase between one or more transacting parties, in accordance with an embodiment of the present invention.

It should be appreciated that the specific steps illustrated in FIG. 5 provide a particular method for performing a remotely supervised inspection of property for purchase between one or more transacting parties, according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 5 illustrates a flowchart of method 500 for performing a remotely supervised inspection of a property for purchase between one or more transacting parties, in accordance with an embodiment of the present invention. In one example, the transacting parties may include a seller or an agent of the seller co-located with the property and a buyer or an agent for the buyer who interfaces with the seller or seller's agent via a remote audio-visual remote presence connection. In some examples, the remote audio-visual remote presence connection may be provided via a network (e.g., 230) that connects at least the remote interface system 210 and the enabling interface device 250 shown in FIG. 2. In one embodiment, the method 500 may be performed by the remote inspection system, utilizing at least the remote interface system 210 and the enabling interface device 250.

In one embodiment, at 502, the method 500 may include receiving a request to inspect a property for sale. In one embodiment, the request may be received from a buyer who may desire to view the property. In some embodiments, the buyer's request may be received via at least one of a voice command or a text message from the buyer via a visual interface device associated with the buyer. In some examples, the visual interface device (e.g., enabling interface device 250) may include a head mounted display device such as Google Glass®. As an example, the buyer may issue a voice command to the visual interface device to obtain directions to the property. The visual interface device may then direct the customer to the property by providing text message directions, audio guides, visual cues and the like.

At 504, the method 500 may include establishing an audio-visual remote presence connection between the transacting parties. In one embodiment, an audio-video remote presence connection may be established between the buyer and the seller upon the buyer's arrival at the property. The buyer may then engage in a real-time conversation with the seller through the virtual interface device, to exchange information about the property. In one embodiment, the seller may be a virtual agent responsible for remotely supervising the inspection at a remote interface system (e.g., 210).

At 506, the method 500 may include transmitting purchase information to the buyer. As an example, the virtual agent may transmit purchase information, including objective information about the property such as the age of the property, acreage and renovation history to the buyer. The purchase information may then be displayed in a display area on the virtual interface device associated with the user.

In certain embodiments, at 508, the method 500 may include receiving one or more buyer requests for additional information. In one embodiment, a buyer may request for additional information via a voice command and/or a text message to the visual interface device. As discussed in detail above, requests for additional information may include requests for information about the property such as the energy efficiency of the property, appliances in the property, non-financial information related to the property such as a list of restaurants in the area in which the property is located, structural information about the property such as the insulation, leaks in construction and the like.

At 510, the method 500 may include generating a response to the buyer requests for additional information. In one example, at 510, the method 500 may include generating a response to the buyer requests by searching for the additional information in one or more of the databases (116, 118, 119, 140), and pushing this additional information to the user's virtual interface device.

In some embodiments, at 510, the method 500 may also include calculating a cumulative cost of the property based at least in part on the additional information. In these embodiments, at 510, the method 500 may include generating a response to the buyer requests by pushing the additional information including the cumulative cost of purchasing the property to the virtual interface device associated with the buyer.

In certain embodiments, at 510, the method 500 may also include automatically deriving additional information related to the property as the buyer is performing a walkthrough of the property, without the buyer having to explicitly request for the additional information. As an example, sensors in the virtual interface device may automatically detect that the buyer is in the property's kitchen and communicate this additional information to the remote interface system. In this embodiment, at 510, the method 500 may include generating a response by pushing the additional information (e.g., renovation information in the property's kitchen) to the visual display interface associated with the buyer.

As another example, sensors in the virtual interface device may be configured to automatically analyze the structure of the property as the buyer is performing a walkthrough of the property and provide this information to the remote interface system. In this example, at 510, the method 500 may include retrieving additional information related to associated costs of repair and impact of insurance on the property and use these costs to calculate a cumulative cost of the property. Then, at 510, the method 500 may include generating a response by pushing the additional information including the cumulative cost of the property to the visual display interface associated with the buyer.

In other examples, additional information may also be automatically provided to the buyer via automated tools integrated into the virtual display interface. For example, as discussed above, a calculator integrated into the virtual display device may take cues from visual elements as seen through the visual interface device to determine the dimensions in a room, as the buyer is performing a walkthrough of the property. The calculator may then interact with a computer aided design tool integrated into the virtual display interface to create a three dimensional floor plan. The three dimensional floor plan may then be displayed on a display area of the virtual display interface associated with the buyer.

At 512, the process 500 may include delivering the response to the buyer. In one embodiment, the response may be delivered to the buyer on the buyer's virtual display interface. In some embodiments, the response including the additional information may be stored in a database (e.g., a customer database 118 as described in FIG. 1). The buyer may retrieve the stored information after the conclusion of the inspection. FIG. 6 illustrates exemplary visual displays that may be provided to the buyer on the buyer's virtual display interface.

FIG. 6 illustrates exemplary visual displays of a preferred embodiment. Visual display 610 displays requested information as a visual overlay to a preferred embodiment head mounted visual display device. Display area 612 displays slightly subjective information such as, for illustrative purposes only, the price of the property with insurance costs for the property and monthly payment of a mortgage for the property as a function what interest rate and down payment the particular customer applies. Display area 614 displays a response from the remote interface system or the virtual agent responsible for remotely supervising the inspection illustrating the customer command feature according to embodiments of the present invention. Display area 614 indicates a response to "Favorite" the selected property, but one having skill in the art will appreciate other visual confirmations to other customer commands. Display area 616 illustrates objective information about the property, such as for illustrative purposes only age of the property, acreage and renovation history. Prompts to display objective information in display are 616 may be customer initiated or initiated by the remote interface system or the virtual agent responsible for remotely supervising the inspection. In one embodiment, display area 616 displays renovation information about a property's kitchen when visual display 610 detects the customer is in the property's kitchen. Such detection by visual display 610 in an alternative embodiment may be performed by sensors located within the property. In another embodiment, detection may be performed by contour matching of the enabling interface device of stored images with the current field of view.

FIG. 7 is high level schematic diagram illustrating a computer system including instructions to perform any one or more of the methodologies described herein. A system 700 includes a computer 710 connected to a network 230. The computer 710 includes a processor 720 (also referred to as a data processor), a storage device 722, an output device 724, an input device 726, and a network interface device 728, all connected via a bus 730. The processor 720 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 720 executes instructions and includes that portion of the computer 610 that controls the operation of the entire computer. Although not depicted in FIG. 7, the processor 720 typically includes a control unit that organizes data and program storage in memory and transfers data and other information between the various parts of the computer 710. The processor 720 receives input data from the input device 726 and the network 230 reads and stores code and data in the storage device 622 and presents data to the output device 724.

Although the computer 710 is shown to contain only a single processor 720 and a single bus 730, the disclosed embodiment applies equally to computers that may have multiple processors and to computers that may have multiple busses with some or all performing different functions in different ways.

The storage device 722 represents one or more mechanisms for storing data. For example, the storage device 722 may include read-only memory (ROM), random access memory (RAM), magnetic disk storage media, optical storage media, flash memory devices, and/or other machine-readable media. In other embodiments, any appropriate type of storage device may be used. Although only one storage device 722 is shown, multiple storage devices and multiple types of storage devices may be present. Further, although the computer 710 is drawn to contain the storage device 722, it may be distributed across other computers, for example on a server.

The storage device 722 includes a controller (not shown in FIG. 6) and data items 734. The controller includes instructions capable of being executed on the processor 720 to carry out the methods described more fully throughout the present specification. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. Of course, the storage device 722 may also contain additional software and data (not shown), which is not necessary to understand the invention.

Although the controller and the data items 734 are shown to be within the storage device 722 in the computer 610710 some or all of them may be distributed across other systems, for example on a server and accessed via the network 230.

The output device 724 is that part of the computer 610 that displays output to the user. The output device 724 may be a liquid crystal display (LCD) well-known in the art of computer hardware. But, in other embodiments the output device 724 may be replaced with a gas or plasma-based flat-panel display or a traditional cathode-ray tube (CRT) display. In still other embodiments, any appropriate display device may be used. Although only one output device 724 is shown, in other embodiments any number of output devices of different types, or of the same type, may be present. In an embodiment, the output device 724 displays a user interface.

The input device 726 may be a keyboard, mouse or other pointing device, trackball, touchpad, touch screen, keypad, microphone, camera, voice recognition device, or any other appropriate mechanism for the user to input data to the computer 710 and manipulate the user interface previously discussed. Although only one input device 726 is shown, in another embodiment any number and type of input devices may be present.

The network interface device 728 provides connectivity from the computer 710 to the network 230 through any suitable communications protocol. The network interface device 728 sends and receives data items from the network 230.

The bus 730 may represent one or more busses, e.g., USB (Universal Serial Bus), PCI, ISA (Industry Standard Architecture), X-Bus, EISA (Extended Industry Standard Architecture), or any other appropriate bus and/or bridge (also called a bus controller).

The computer 710 may be implemented using any suitable hardware and/or software, such as a personal computer or other electronic computing device. Portable computers, laptop or notebook computers, PDAs (Personal Digital Assistants), mobile phones, pocket computers, tablets, appliances, telephones, and mainframe computers are examples of other possible configurations of the computer 710. For example, other peripheral devices such as audio adapters or chip programming devices, such as EPROM (Erasable Programmable Read-Only Memory) programming devices may be used in addition to, or in place of, the hardware already depicted. In some embodiments, the computer 710 may be configured to implement the remote interface system 210 to perform remote inspections of a property for sale.

The network 230 may be any suitable network and may support any appropriate protocol suitable for communication to the computer 610. In an embodiment, the network 230 may support wireless communications. In another embodiment, the network 230 may support hard-wired communications, such as a telephone line or cable. In another embodiment, the network 230 may support the Ethernet IEEE (Institute of Electrical and Electronics Engineers) 802.3x specification. In another embodiment, the network 230 may be the Internet and may support IP (Internet Protocol). In another embodiment, the network 230 may be a local area network (LAN) or a wide area network (WAN). In another embodiment, the network 230 may be a hotspot service provider network. In another embodiment, the network 230 may be an intranet. In another embodiment, the network 230 may be a GPRS (General Packet Radio Service) network. In another embodiment, the network 230 may be any appropriate cellular data network or cell-based radio network technology. In another embodiment, the network 230 may be an IEEE 802.11 wireless network. In still another embodiment, the network 230 may be any suitable network or combination of networks. Although one network 230 is shown, in other embodiments any number of networks (of the same or different types) may be present.

A user computer 250 can interact with computer 610 through network 230. The user computer 250 includes a processor 252, a storage device 254, and an input/output device 256. The description related to processor 720 and storage device 722 is applicable to processor 252 and storage device 254. As an example, the user computer 250 can be a personal computer, laptop computer, or the like, operated by a member of a membership organization (e.g., the present assignee). Using the user computer 250, the member can then interact with computer 710 operated by the present assignee through network 230 in order to access the present assignee's web pages or the like. In some embodiments, the user computer 250 may be configured to implement the enabling interface device 250 as discussed in relation to FIG. 2.

The embodiments described herein may be implemented in an operating environment comprising software installed on any programmable device, in hardware, or in a combination of software and hardware. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A remote inspection system comprising:
a lockbox at a property;
a processor communicatively coupled to the lockbox at the property; and
a memory, communicatively coupled to the processor, comprising instructions, that when executed by the processor, cause the processor to:
receive, from a mobile device, a request to inspect the property;
establish an audio-visual remote presence connection with the mobile device, wherein:
video of at least a portion of the property is portrayed on the mobile device in real time, a digital image of an object is projected onto the video of the least portion of the property, wherein the object is not located at the property,
a party associated with the property is portrayed on the mobile device in real time, and
wherein the party is not located at the property;
provide an authentication token via the audio-visual remote presence connection to the lockbox, to enable physical access to a secured area of the property;
cause a plurality of purchase information to be transmitted to the mobile device;
receive a plurality of requests for additional information;
generate a response to at least one of the plurality of requests for additional information; and
cause the response to be transmitted to the mobile device.

2. The system of claim 1, wherein the plurality of requests for additional information are based at least in part on a voice command or a text message from the mobile device.

3. The system of claim 1, wherein the additional information is automatically derived by the mobile device.

4. The system of claim 1, wherein the plurality of purchase information is transmitted to the mobile device via the audio-visual remote presence connection.

5. The system of claim 1, wherein the mobile device comprises a head mounted display.

6. The system of claim 1, wherein the instructions further cause the processor to record a video feed of at least a portion of an inspection of the property; and
store the video feed of the inspection.

7. The system of claim 1, wherein the instructions further cause the processor to calculate a cumulative cost of purchasing the property, wherein the cumulative cost incorporates at least one of the plurality of requests for additional information.

8. A method for performing remote inspection of a property, the method comprising:
receiving, using a processor, a request from a mobile device to inspect the property;
establishing, using the processor, an audio-visual remote presence connection with the mobile device, wherein:
video of at least a portion of the property is portrayed on the mobile device in real time,
a digital image of an object is projected onto the video of the least portion of the property, wherein the object is not located at the property,
a party associated with the property is portrayed on the mobile device in real time,
and the party is not located at the property;
transmitting, using the processor, an authentication token via the audio-visual remote presence connection to a lockbox at the property, wherein the authentication token enables physical access to a secured area of the property;
transmitting, using the processor, a plurality of purchase information to at least the mobile device;
receiving, using the processor, a plurality of requests for additional information;
generating, using the processor, a response to at least one of the plurality of requests for additional information; and
transmitting, using the processor, the response to the mobile device.

9. The method of claim 8, wherein the plurality of requests for additional information are based at least in part on a voice command or a text message from the mobile device.

10. The method of claim 8, wherein the additional information is automatically derived by the mobile device.

11. The method of claim 8, wherein the plurality of purchase information is transmitted to the mobile device via the audio-visual remote presence connection.

12. The method of claim 8, wherein the digital image comprises an image of furniture.

13. The method of claim 8, wherein enabling physical access to the secured area of the property comprises transmitting a mobile text message to a lockbox for keys to the property.

14. A non-transitory computer-readable storage medium comprising a plurality of computer readable instructions tangibly embodied on the computer-readable storage medium, which, when executed by a processor, perform a remote inspection of a property, the plurality of instructions comprising:
receiving a request from a mobile device to inspect the property;
establishing an audio-visual remote presence connection with the mobile device, wherein:
video of at least a portion of the property is portrayed on the mobile device in real time,
a digital image of an object is projected onto the video of the least portion of the property, wherein the object is not located at the property,
a party associated with the property is portrayed on the mobile device in real time, and
the party is not located at the property;
transmitting an authentication token via the audio-visual remote presence connection to a lockbox at the property, wherein the authentication token enables physical access to a secured area of the property;
causing a plurality of purchase information to be transmitted to at least the mobile device;
receiving a plurality of requests for additional information;
generating a response to at least one of the plurality of requests for additional information; and
causing the response to be transmitted to the mobile device.

15. The non-transitory computer-readable storage medium of claim 14, wherein the plurality of requests for additional information are based at least in part on a voice command or a text message from the mobile device.

16. The non-transitory computer-readable storage medium of claim 14, wherein the mobile device comprises a head mounted display.

17. The non-transitory computer-readable storage medium of claim 14, the instructions further comprise:
providing instructions to the mobile device to record a video feed of at least a portion of an inspection of the property established via the audio-visual remote presence connection; and
providing instructions to the mobile device to store the video feed of the inspection.

18. The non-transitory computer-readable storage medium of claim 14, wherein the instructions further comprise calculating a cumulative cost of purchasing the property, wherein the cumulative cost incorporates at least one of the plurality of requests for additional information.

19. The computer-readable storage medium of claim 14, wherein the video of the least portion of the property is received from a drone located at the property.

20. The computer-readable storage medium of claim 14, wherein the audio-visual remote presence connection enables piloting of a drone via the mobile device, wherein the drone is located at the property and transmits the video.

* * * * *